United States Patent [19]

Barraud et al.

[11] Patent Number: 5,196,257

[45] Date of Patent: Mar. 23, 1993

[54] BIDIMENSIONAL ORGANIC DIAPHRAGMS AND THEIR PREPARATION PROCESSES

[75] Inventors: André Barraud, Bures-sur-Yvette; Serge Palacin, Montigny; Florence Porteu, Tours; Annie Ruaudel, Verrieres le Buisson, all of France

[73] Assignee: Commissariat a l'Energie Atomique, Paris, France

[21] Appl. No.: 747,746

[22] Filed: Aug. 20, 1991

[30] Foreign Application Priority Data

Aug. 23, 1990 [FR] France ................ 90 10597

[51] Int. Cl.$^5$ ............................................. B32B 27/28
[52] U.S. Cl. .................... 428/220; 428/333; 525/326.7; 525/355; 526/240; 526/241; 526/258; 526/259; 526/263; 526/285; 526/321; 526/91; 526/221; 528/491; 427/434.3
[58] Field of Search ............... 526/322, 258, 321, 259, 526/263; 525/326.7; 428/333, 220; 427/434.3

[56] References Cited

U.S. PATENT DOCUMENTS 4,632,800 12/1986 Barraud et al. .................. 264/298
4,886,685 12/1989 Wegner et al. .................. 427/430.1

FOREIGN PATENT DOCUMENTS 0170535 2/1986 European Pat. Off. .
0246500 11/1987 European Pat. Off. .
0334676 9/1989 European Pat. Off. .

OTHER PUBLICATIONS

Thin Solid Films, vol. 133, Nos. 1-4, Nov., 1985, pp. 83-91, A. Miller et al., "Langmuir-Blodgett Films Containing Porphyrins in a Well-Defined Environment".

Primary Examiner—Joseph L. Schofer
Assistant Examiner—Mark Nagumo
Attorney, Agent, or Firm—Pearne, Gordon, McCoy & Granger

[57] ABSTRACT

The invention relates to bidimensional organic membranes or diaphragms and to their preparation processes.

These diaphragms have at least one monomolecular layer of organic molecules A, such as porphyrins, phthalocyanines and porphyrazines. In a layer, each molecule A is directly or indirectly bonded to n (n≧3) identical molecules A by n bonds arranged symmetrically with respect to the center of the molecule A.

Therefore there diaphragms have microscopic physical properties identical in at least two directions of the plane of the diaphragm. They can be used as conductive diaphragms.

22 Claims, 5 Drawing Sheets

FIG. 5 (III)

BIDIMENSIONAL ORGANIC DIAPHRAGMS AND THEIR PREPARATION PROCESSES

The present invention relates to organic diaphragms or membranes constituted by at least one thin organized layer having particular properties making them of interest in numerous fields. More specifically, it relates to ultrathin diaphragms having identical microscopic physical properties in at least two directions of the diaphragm plane.

Such organic diaphragms can in particular be used as self-supported ultrathin diaphragms in the study of the diffusion of ions and the separation of chemical species in a gaseous or liquid medium, as a tough, insoluble, invisible hydrophobic protective diaphragm for protecting various substrates against corrosion, oxidation, friction, etc. as a photoresist, as a covering for masking defects of a substrate, or as an electricity conducting diaphragm.

The presently known, thin organic diaphragms are constituted by optionally crosslinked polymers, i.e. having linear polymer chains optionally linked together by transverse bonds distributed in a random manner. Due to the absence or random distribution of the transverse bonds between the chains, these diaphragms have physical properties which differ on the microscopic scale, on passing from the direction corresponding to the direction of the chains to other directions.

The present invention specifically relates to an organic diaphragm essentially having the structure of a polymer, in which the molecules which correspond to the monomer units of the polymer are interconnected so as to form an organized network, which gives the diaphragm identical microscopic properties in at least two directions of the diaphragm plane.

According to the invention, the diaphragm has at least one monomolecular layer of organic molecules and is characterized in that each organic molecule of the monomolecular layer is bonded to n identical molecules of the same layer, n being an integer at least equal to 3, by n direct chemical bonds or by n indirect chemical bonds each incorporating a divalent ion and in that the n chemical bonds between a central molecule and the n adjacent molecules are arranged substantially symmetrically with respect to the centre of the central molecule.

Thus, the diaphragm according to the invention has a highly organized structure because in each molecular layer, each molecule is surrounded by n identical molecules to which it is bonded, said n molecules being distributed symmetrically around the central molecule.

Preferably, in the invention, the organic molecules are macrocyclic molecules having polar groups, which are adapted to the formation of monomolecular layers.

As an example of macrocyclic molecules, reference can be made to phthalocyanines and porphyrins.

According to a first embodiment of the diaphragm according to the invention, the n chemical bonds are direct chemical bonds such as covalent bonds.

According to a second embodiment of the diaphragm according to the invention, the n chemical bonds are indirect chemical bonds between a first molecule of the layer and a second adjacent molecule of the layer and each indirect chemical bond has a first ionic bond between the first molecule and a divalent ion and a second ionic bond between said divalent ion and the second molecule.

According to a variant of the invention, the organic diaphragm is constituted by different molecules. In this case, each monomolecular layer is constituted by molecules A and B, each molecule A being chemically bonded to n molecules B, n being an integer at least equal to 3 and each molecule B is chemically bonded to n molecules A, the n bonds between a molecule A and the n molecules B surrounding it being arranged symmetrically with respect to the centre of the molecule A and the n bonds between a molecule B and the n molecules A surrounding it being arranged symmetrically with respect to the centre of the molecule B.

The bonds between the molecules A and B can in particular be ionic bonds.

The diaphragms according to the invention can be produced from identical or different molecules having n polymerizable functions or n reactive functions arranged symmetrically around the centre of the molecule.

The invention also relates to a process for the preparation of the aforementioned organic diaphragms, which consists of preparing at least one monomolecular layer of molecules, which are the same or different, each having n polymerizable functions or n reactive functions and polymerizing or reacting between them the said molecules within the layer, either prior to deposition, or following deposition thereof on an appropriate support.

Other features and advantages of the invention can be gathered from the following illustrative and non-limitative description with reference to the drawings, wherein show.

According to the invention, the organic molecules used therein are molecules appropriate for producing monomolecular layers.

A known method for producing monomolecular layers is the Langmuir Blodgett method, which uses "amphiphilic", or "amphiphatic" molecules. It is pointed out that these amphiphilic or amphiphatic molecules are organic molecules having a hydrophobic part, i.e. a part having a repulsion for polar liquid such as water, and a hydrophilic part, i.e. a part having an affinity for polar liquids such as water.

As a result of special characteristics, on introducing amphiphilic molecules on to the surface of a liquid such as water, the molecules spread over the surface of the liquid and orient in such a way that their hydrophilic part is immersed in the water, whilst their hydrophobic part, generally constituted by a long hydrocarbon chain, tends to move away therefrom, so that the axis of the chain becomes perpendicular to the surface of the water. If the cohesion forces between the molecules are adequate, said molecules remain grouped and limit their spread to a continuous monomolecular film essentially having the thickness of one molecule, which corresponds to a monomolecular layer or Langmuir film. Such films can be manipulated on the surface of the water and then deposited on a solid support after having been compressed under an appropriate surface pressure, according to the Langmuir Blodgett method described in J. of Am. Chem. Soc., vol. 57, 1935, pp. 1007–1010.

Another method for forming monomolecular layers is the adsorption method from a solution of molecules, e.g. on oxidized silicon.

In the diaphragm according to the invention, preference is given to the use of molecules which can be deposited by the Langmuir Blodgett procedure, namely amphiphilic molecules or molecules having highly hydrophilic groups which can be associated, e.g. by ionic bonds, with anions or cations having a long hydrophobic chain.

As examples of molecules usable in the invention, reference can be made to macrocyclic molecules of the phthalocyanine, porphyrin and porphyrazine type, which have substituents formed by long hydrophobic chains, or said same molecules in the form of cations associated with anions having a long hydrophobic chain.

According to the invention, it is also possible to use non-amphiphilic molecules, e.g. of the phthalocyanine, porphyrin or porphyrazine type, by complexing them with other amphiphilic molecules, as is described in FR-A-2 564 004, for depositing them in the form of a monomolecular layer on the surface of a liquid.

In this case, following deposition and polymerization of the layer for bonding together the non-amphiphilic molecules, it is possible to extract the amphiphilic molecules associated with the non-amphiphilic molecules by an appropriate solubilization treatment in order to obtain a diaphragm constituted solely by a crosslinked polymer of non-amphiphilic molecules.

Thus, when the molecules are constituted by a non-amphiphilic cation carrying n polymerizable functions and an amphiphilic anion having at least one hydrophobic chain, the hydrophobic chain amphiphilic anions are eliminated following the polymerization of the cations of the monomolecular layer.

This can be carried out by destroying the ionic bonds between these anions and the non-amphiphilic molecules by the action of an inorganic acid such as hydrochloric acid. Thus, the long hydrophobic chain anion is replaced by the anion of the acid used, e.g. Cl$^-$ and then the long hydrophobic chain anion is eliminated by dissolving in an appropriate organic solvent.

Thus, the polymerized amphiphilic molecules crosslinked as a result of the bonds established in the n directions of the plane of the layer are insoluble in water and organic solvents.

The films obtained in this way and which are free from hydrophobic chains are of interest as materials allowing the passage of the tunnel current and are e.g. usable in ultra-high frequency diodes, for display purposes or for cold electron emission.

The molecules used in the invention must have n polymerizable functions or n reactive functions able to form ionic bonds or covalent bonds, either directly with the organic molecules of the layer, or indirectly via divalent ions.

According to the invention, n is at least equal to 3 and can e.g. be 3 to 6, n being generally 3 or 4.

Figure 1:
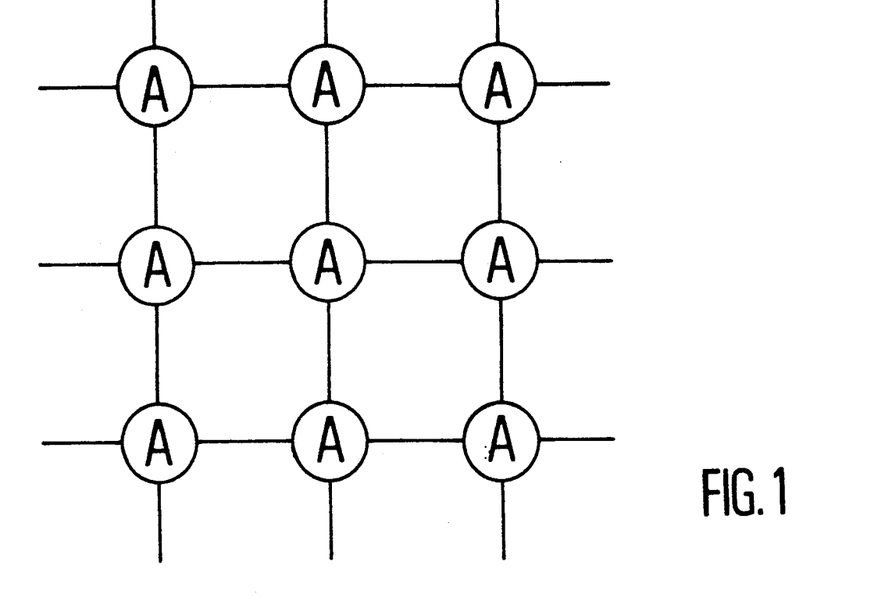
FIG. 1 —Diagrammatically the structure of a monomolecular layer formed by identical molecules A joined by covalent bonds.

FIG. 1 represents the first embodiment of the invention, in which each layer of the diaphragm is formed from identical molecules A interconnected by direct covalent bonds.

Such a structure can be obtained by preparing and depositing on a substrate at least one monomolecular layer of molecules A, each of which has n polymerizable functions, n being an integer at least equal to 3, and by polymerizing the molecules of the layer or layers in order to chemically bond them together via these n functions.

The polymerizable functions of the molecules can be of different types. Generally preference is given to functions not requiring for their polymerization severe temperature or similar conditions, so as not to bring about a deterioration of the organization of the diaphragm in monomolecular layer form. For example, it is possible to use ethylenically or acetylenically unsaturated functions.

Thus, the ethylenic unsaturation molecules usable in this first embodiment of the invention are e.g. unsaturated esters of pentaerythritol in accordance with the following formula:

in which p is an integer from 14 to 26, as well as the quaternary ammonium salts of ω-alkylenoic acids of formula in which p is an integer from 14 to 26.

Acetylenic unsaturation molecules usable in this first embodiment of the invention can e.g. be tetra N-(2-propynyl) pyridynium porphyrin salts.

The following examples 1 to 5 illustrate the production of the organic diaphragms according to the first embodiment of the invention with n being equal to 4.

EXAMPLE 1

This example uses as organic molecules the ω-tricosenoic ester of pentaerythritol (PEOM1), namely the compound of formula (I) in which p=20.

This example uses the Langmuir Blodgett method for preparing each monomolecular layer on the surface of a tank filled with water.

Thus, on the surface of the tank is formed a monomolecular layer of ω-tricosenoic ester of pentaerythritol. The monomolecular layer is then compressed under a pressure of 28 mN/m and is deposited on a silicon substrate, which has previously been covered by 5 monomolecular behenic acid layers.

These operations are then recommenced in order to successively deposit 15 PEOM1 layers on the substrate and the layers are then irradiated through a mask by means of a beam of electrons accelerated to 5 kV and using an irradiation dose of 1 μC/cm$^2$, which gives an insoluble organic diaphragm.

The substrate covered with the diaphragm is then immersed in ethanol, which dissolves the underlying behenic acid layers and the unpolymerized locations protected by the mask. The polymerized diaphragm is thus disengaged from the substrate and then floats in the methanol. Thus, polymerized diaphragm fragments are recovered, whose size and shape correspond to the holes in the irradiation mask. These fragments are recovered and a check is made to ensure that they have the structure shown in FIG. 1 by examining them by infrared and UV visible absorption spectrometry.

EXAMPLE 2

This example also uses the ω-tricosenoic ester of pentaerythritol of formula (I) with n=20 for forming an organic diaphragm.

This example follows the same operating procedure as in example 1 for depositing on a substrate previously covered with an aluminium film of thickness 60 nm (600 Å) by vacuum evaporation, 15 monomolecular layers of PEOM1, which is then subject to a beam of electrons accelerated to 5 kV and with a total dose of 1 $\mu C/cm^2$.

Following polymerization, the thus treated substrate is immersed in ethanol, which dissolves the non-irradiated part of the diaphragm and dose and not disengage the polyermized diaphragm, which then serves as a protective resist with a view to plasma etching of the aluminium. Plasma etching is then carried out and it is found that the etching is selective and only acts on the unprotected aluminium, which disappears entirely without having any effect on those parts of the aluminium film protected by the diaphragm.

EXAMPLE 3

Figure 4:
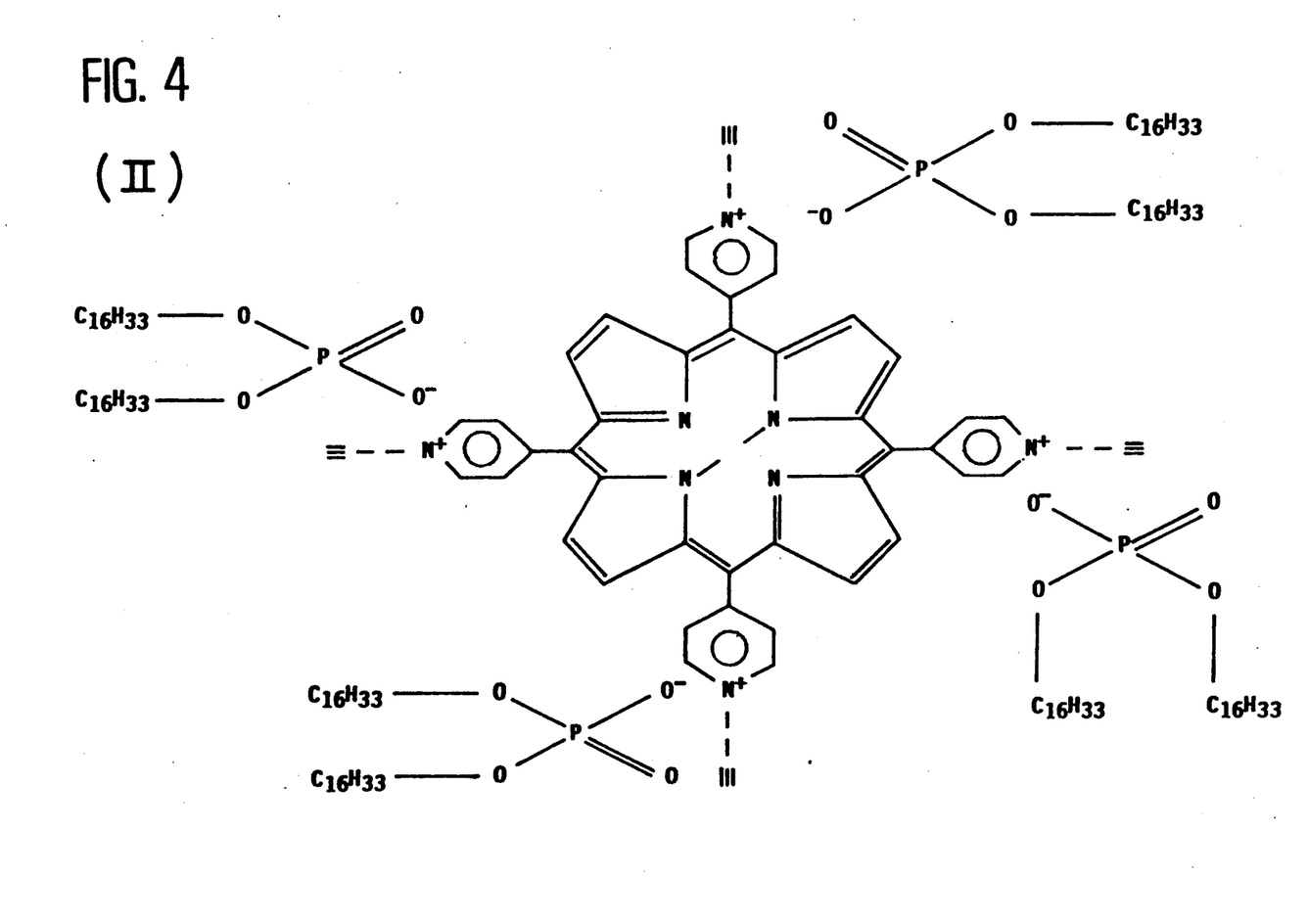
FIGS. 4 to 6 —Formulas of molecules usable in the invention.

The molecules used in this example are molecules of tetra-N-(2-propynyl)-tetrapyridynium porphyrin dihexadecyl phosphate in accordance with formula (II) of the attached FIG. 4.

In this case, the basic molecule having four symmetrical polymerizable acetylene functions is a molecule unable to directly form a monomolecular layer on the surface of the water. In order to make it amphiphilic, it is coupled to the dihexadecyl phosphate, which has two long hydrophobic chains with 16 carbon atoms.

Firstly the tetra-3-pyridyl porphyrin is prepared by reacting 3-pyridyl carboxaldehyde with pyrrole in propionic acid. It is then purified in methanol in which it is insoluble and is then recrystallized in a mixture of methanol and chloroform to obtain a pure product.

This is followed by the quaternization of the tetra-3-pyridyl porphyrin by refluxing it for 15 h with a large 2-propynyl bromide excess in dimethyl formamide. The quaternary salt is insoluble in hot ether, which extracts the tetra-3-pyridyl porphyrin and the bromide which has not reacted. This porphyrin is then dissolved in water and this aqueous solution is placed in a Langmuir tank.

On to the surface of the tank is then introduced dihexadecylphosphoric acid, which spreads over the aqueous solution to form a monomolecular layer. The porphyrin molecules dissolved in the aqueous solution are attracted by the phosphate groups and form at the interface a very fluid monomolecular layer, which can be transferred under a pressure of 40 mN/m on to an optically transparent fluorine substrate.

In this way 21 layers of tetra-N(2-propynyl)-pyridynium porphyrin dihexadecyl phosphate are deposited. This substrate is then immersed for a few hours in ammoniacal silver nitrate. This gives a silver polyacetylide, which is insoluble in chloroform, but which can be deteriorated in an acid medium.

EXAMPLE 4

This example uses the same molecules as in example 3, but following the formation of a monomolecular layer on the surface of the tank. This layer is polymerized by the progressive replacement of the aqueous solution by an aqueous solution containing $Ag^+$ ions. In this way on the surface of the water is obtained a very resistant, polymerized monomolecular layer which can be transferred to a substrate, e.g. for covering a porous substrate.

This diaphragm can be used for smoothing substrates or as a control permeability barrier for the separation of gases or small molecules in solution. This diaphragm is insoluble in chloroform.

EXAMPLE 5

This example uses the same molecules as in examples 3 and 4, whilst proceeding in the same way as in example 4, but carrying out polymerization of the monomolecular layer on the surface of the tank by the progressive replacement of the aqueous solution by an ammoniacal cupric chloride/cuprous chloride solution, which carries out an oxidizing coupling.

The resulting diacetylene polymer, which is very strong mechanically, is then transferred under a pressure of 45 mN/m to an insulating quartz substrate. Thus, on the substrate are superimposed 101 polymerized monomolecular layers and it is found that the thus obtained diaphragm has a low electrical conductivity of approximately $10^{-6} S\cdot cm^{-1}$. Thus, the organized structure of the membrane makes it possible to obtain an electrical conductivity without doping the polymer.

It is then possible to extract the dihexadecylphosphoric acid chains associated with the diacetylene polymer by dissolving the latter in chloroform, after treating the diaphragm for a few seconds with hydrochloric acid vapours, which destroy the ion bonds between the molecules of dihexadecylphosphoric acid and porphyrin and replaces the dihexadecylphosphoric anion by the Cl− anion. Thus, thermally stable, very thin polyporphyrin films are obtained, which are suitable as a material permitting the passage of the current by the tunnel effect.

Figure 2:
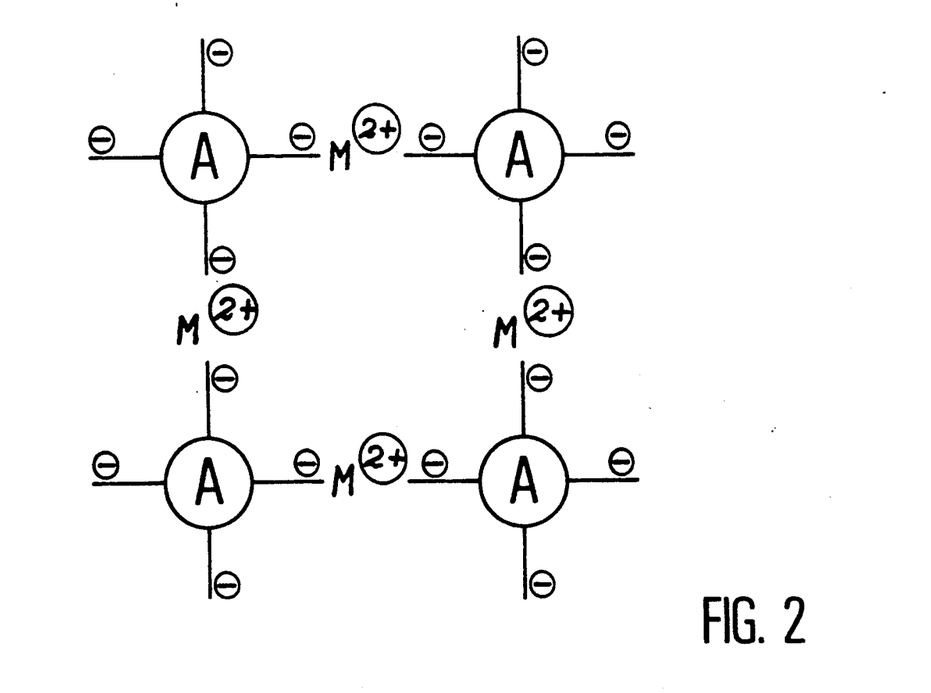
FIG. 2 —Diagrammatically the structure of a monomolecular layer formed from identical molecules A having 4 negative charges distributed symmetrically around the molecule A and associated with one another by means of divalent ions $M^{2+}$.

FIG. 2 shows the second embodiment of the invention, in which identical molecules A having in each case 4 negative charges symmetrically distributed around their centre are interconnected by divalent bonds $M^{2+}$ carrying 2 positive charges. Molecules suitable in this second embodiment are e.g. amphiphilic molecules having n acid functions.

Obviously, it is also possible to use in the second embodiment amphiphilic molecules having n positive charges and a divalent anion.

For producing the diaphragm, it is possible to use a process having the following stages:
  (a) preparing a monomolecular layer of amphiphilic molecules having n positive or negative charges, n being an integer at least equal to 3, using for the formation of the layer a liquid containing in solution a divalent ion having a charge opposite to those of the amphiphilic molecules so as to bond together these molecules by means of the divalent ions and
  (b) transferring the thus formed monomolecular layer to a substrate.

For example, each layer can be formed by an alkaline earth salt of tetra-4-oxy(2-octadecanoic acid) phenyl porphyrin.

Example 6 illustrates the formation of such a diaphragm in the case where n is equal to 4.

EXAMPLE 6

Figure 5:
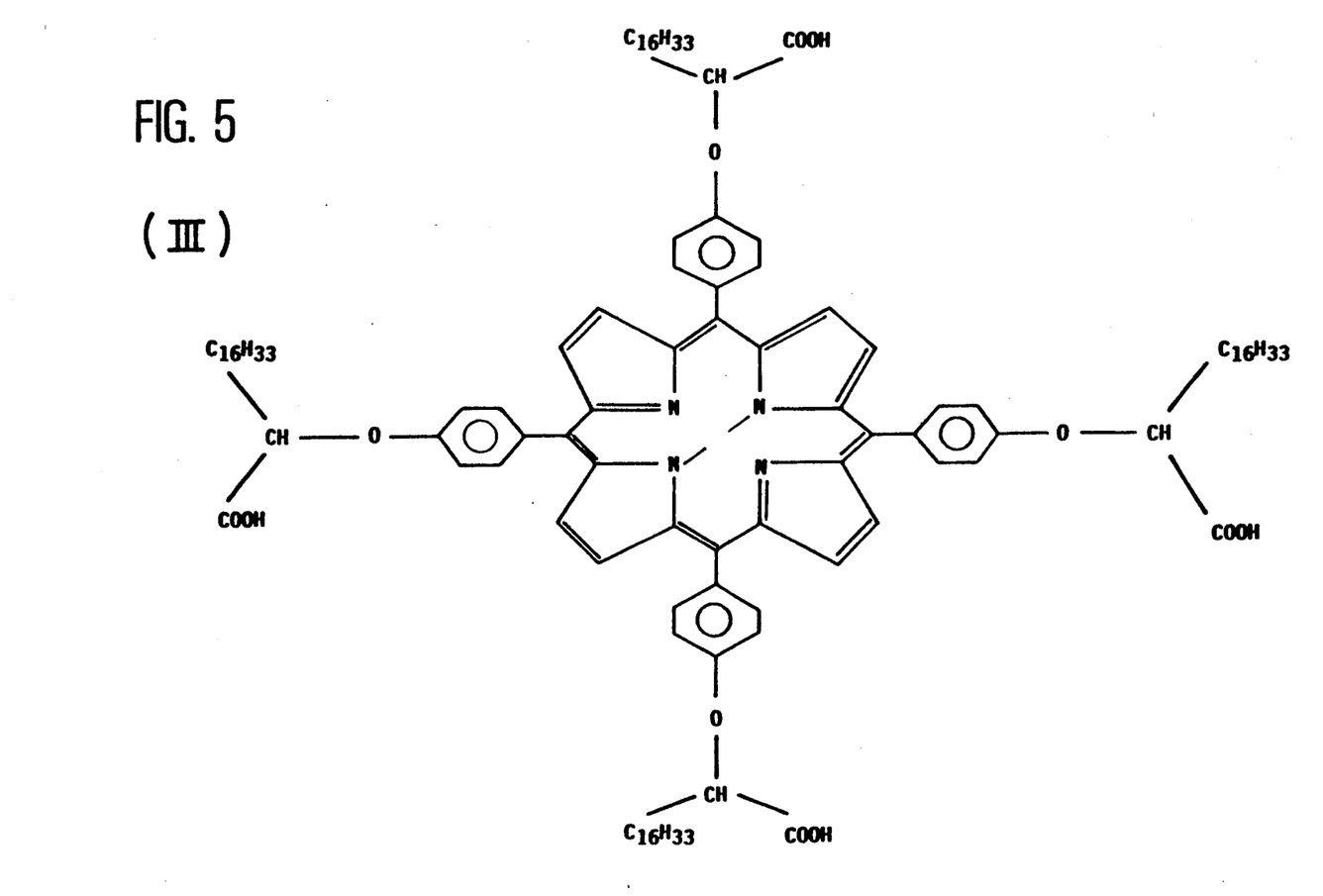

This example uses as the amphiphilic molecule an amphiphilic tetraphenyl porphyrin having 4 COOH groups and 4 hydrophobic chains with 18 carbon atoms and of formula (III) of the attached FIG. 5, in which the centre O is occupied by $H_2$, Cu or Co/imidazole of formula:

These molecules are prepared in the following way. Firstly, the ethyl 2-bromooctadecanoate is prepared by reacting octadecanoic acid with $SOCl_2$ at 100° C. to form the corresponding acid chloride, which is reacted with bromine at 60° C. for 4 h to form the 2-bromooctadecanoic acid bromide. The said acid is then reacted with ethyl alcohol at ambient temperature to form ethyl 2-bromooctadecanoate. The latter is then used for preparing tetra-4-oxy(2-octadecanoic acid) phenyl porphyrin.

For this purpose the ethyl 2-bromooctadecanoate is reacted with hydroxybenzaldehyde in the presence of potash and ethyl alcohol for 4 h in order to form the aldehyde of formula:

This is followed by the reaction of an equivalent of said aldehyde under reflux for 1 h with an equivalent of pyrrole in propionic acid. After cooling, the acid solution is diluted with ice water and neutralized by ammonia.

The brown precipitate is then filtered, washed with water, extracted with ether, dried and distilled in vacuo. This gives the tetraporphyrin in the form of the ethyl ester. The ester group is saponified in alcoholic potash and then neutralized by hydrochloric acid to obtain the free acid of formula (III).

This molecule is then used for preparing a monomolecular layer on the surface of a water-filled tank containing $BaCl_2$ in solution. The molecules of formula (III) are spread over the surface of the liquid of the tank and the acid functions of two adjacent molecules are bridged by the divalent ions $Ba^{2+}$ present in the tank water.

The thus obtained film is then compressed under a pressure of 40 mN/m and transferred to a substrate at a reduced speed of at the most 0.5 cm/min. The thus transferred diaphragm is insoluble in chloroform.

These operations can be repeated by using the same porphyrin, but not in the free base form, but instead in complex form with copper or with Co imidazole and equivalent results are obtained.

Figure 3:
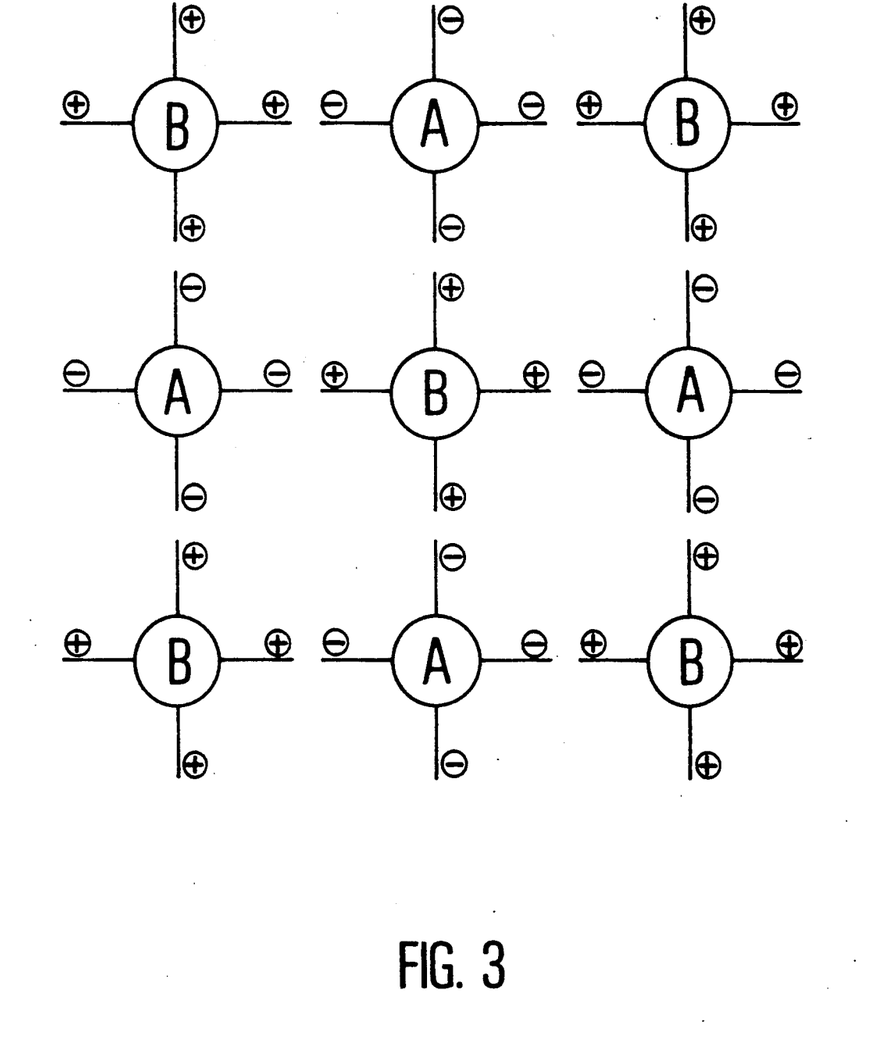
FIG. 3 —Diagrammatically the structure of a monomolecular layer formed from molecules A and B, each having 4 charges of opposite signs.

FIG. 3 shows the constructional variant of the diaphragm according to the invention, in which use is made of two types of molecules A and B in the form of ions carrying n charges of opposite signs with n=4. In this case the bonds between the molecules A and B are ion bonds.

The molecules A can be tetraphenyl porphyrins having 4 substituents COO—, e.g. molecules of formula (III) of example 6. The positively charged molecules B can be tetra N-alkyl pyridynium porphyrin, e.g. tetra-3-octadecyl pyridynium porphyrin in the form of a complex with $Fe_2O$, which is in accordance with formula IV of the attached FIG. 6.

Such a diaphragm can be prepared by a process having the following stages:
(a) forming on the surface of a liquid a monomolecular layer of molecules A and B, the molecules A having n negative charges and the molecules B n positive charges with n being an integer at least equal to 3 and
(b) transferring the thus formed layer to a substrate.

Figure 6:
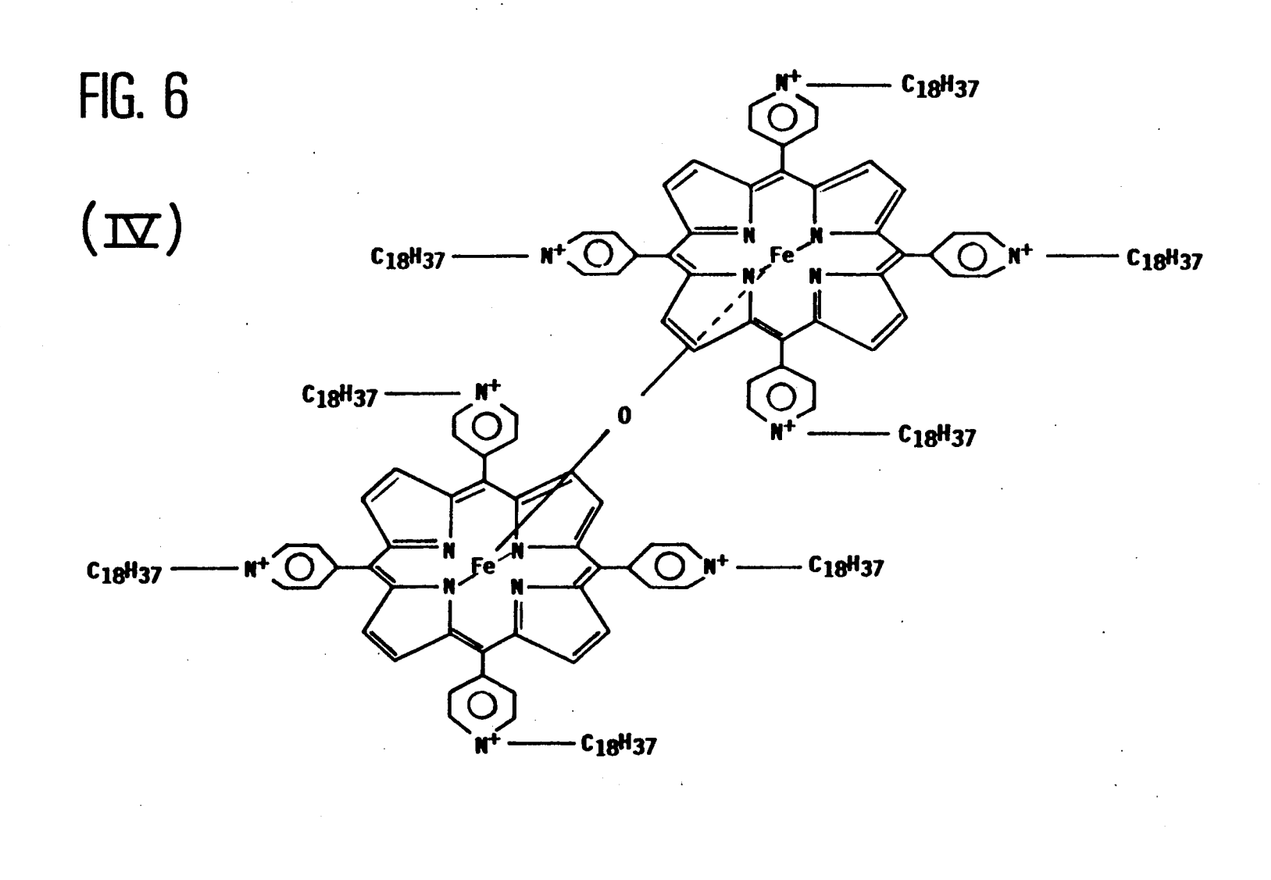

The following example 7 illustrates the preparation of such a diaphragm from molecules A of formula (III) and molecules B of formula (IV).

EXAMPLE 7

The molecules B of formula (IV) are prepared by reacting tetra-3-pyridyl porphyrin with octadecyl bromide following the same operating procedure as in example 3. Two molecules of the thus obtained porphyrin are then coupled via two iron atoms and an oxygen atom, in the manner shown in the formula.

On to the aqueous surface of a Langmuir tank is spread an equimolecular mixture of molecules A and molecules B in chloroform. This leads to the formation of a molecular layer having the structure shown in FIG. 3 on the surface of the water, where ion bonds are formed between the molecules A, which are four acid functions and the molecules B, which are four basic functions.

The layer is then compressed under a pressure of 35 mN/m and transferred to an optically transparent calcium fluoride substrate. In this way deposition takes place of 101 monomolecular layers, which remain perfectly transparent. The thus deposited diaphragm is insoluble in chloroform, whereas the molecules forming it are soluble in chloroform.

By anisotropic electronic paramagnetic resonance and linear dichroism in the visible ultraviolet, it is found that each layer of the diaphragm has the structure shown in FIG. 3. This gives a hydrophobic protection of the calcium fluoride substrate, which is particularly resistant to friction and solvents.

We claim:
1. Diaphragm comprising at least one monomolecular layer of organic molecules, wherein each organic molecule of the monomolecular layer is bonded to n identical molecules of the same layer, n being an integer chosen from the group consisting of 3, 4, and 6, by n direct chemical bonds or by n linking groups consisting of a divalent ion bonded to two molecules by ionic bonds and wherein the n chemical bonds between a central molecule and the n adjacent molecules are arranged so that the molecules form a substantially regular array, and wherein said molecules are amphiphilic or capable of complexing with amphiphilic molecules.

2. Diaphragm according to claim 1, wherein the molecules are macrocyclic molecules.

3. Diaphragm according to claim 1, wherein the n direct chemical bonds are covalent bonds.

4. Diaphragm according to claim 3, wherein each layer is formed by a polymer of the ω-alkylenoic ester of pentaerythritol of formula:

in which p is an integer from 14 to 26.

5. Diaphragm according to claim 4, wherein p is 20.

6. Diaphragm according to either of the claims 1 or 2, wherein the indirect chemical bonds between a first molecule of the layer and a second adjacent molecule of the layer incorporate in each case a first ion bond between the first molecule and a divalent ion and a second ion bond between said divalent ion and the second molecule.

7. Diaphragm according to claim 6, wherein each layer is formed by an alkaline earth salt of tetra-4-oxy(2-octadecanoic acid) phenyl porphyrin.

8. Diaphragm according to claims 1 or 2, wherein each monomolecular layer is a polymer of a salt of tetra N-(2-propynyl) pyridinium porphyrin.

9. Diaphragm according to claim 8, wherein the salt is a dialkyl phosphate of tetra N-(2-propynyl) pyridynium porphyrin.

10. Diaphragm according to claim 8, wherein the salt is a chloride of tetra N-(2-propynyl) pyridynium porphyrin.

11. Process for the preparation of a diaphragm according to claim 1, wherein it comprises the following stages:
(a) preparing and depositing on a substrate at least one monomolecular layer of molecules each having n polymerizable functions, n being an integer chosen from the group consisting of 3, 4, and 6 and
(b) polymerizing the molecules of the layer or layers for chemically bonding them together via said n functions.

12. Process according to claim 11, wherein the n polymerizable functions are ethylene functions.

13. Process according to claim 11, wherein the n polymerizable functions are acetylene functions.

14. Process for the preparation of a diaphragm according to claim 1, wherein it comprises the following successive stages:
(a) preparing a monomolecular layer of molecules, each comprising n polymerizable functions, n being an integer chosen from the group consisting of 3, 4, and 6,
(b) polymerizing the molecules of the layer in order to chemically bond them together and
(c) transferring the polymerized layer to a substrate.

15. Process for the preparation of a diaphragm according to claim 1, wherein it comprises the following stages:
(a) preparing a monomolecular layer of amphiphilic molecules having n positive or negative charges, n being an integer chosen from the group consisting of 3, 4, and 6, using for the formation of the layer a liquid containing in solution a divalent ion having a charge opposite to those of the amphiphilic molecules, so as to bond together said molecules via divalent ions and
(b) transferring the thus constituted monomolecular layer to a substrate.

16. Diaphragm comprising at least one monomolecular layer, wherein the monomolecular layer is constituted by molecules A and B, each molecule A being chemically bonded to n molecules B, n being an integer chosen from the group consisting of 3, 4, and 6 and each molecule B is chemically bonded to n molecules A, the n bonds between a molecule A and the n molecules B surrounding it being arranged symmetrically with respect to the center of the molecule A and the n bonds between a molecule B and the n molecules A surrounding it being arranged symmetrically with respect to the center of the molecule B.

17. Diaphragm according to claim 16, wherein the bonds between the molecules A and B are ion bonds.

18. Diaphragm according to claim 17, wherein the molecule A is a tetraphenyl porphyrin having 4 COO— substituents and the molecule B is a N-alkyl tetrapyridynium porphyrin.

19. Process for the preparation of a diaphragm according to claim 16, wherein it comprises the following stages:
(a) forming on the surface of a liquid a monomolecular layer of molecules A and molecules B, the molecules A having n negative charges and the molecules B n positive charges with n being an integer chosen from the group consisting of 3, 4, and 6 and
(b) transferring the thus formed layer to a substrate.

20. Diaphragm according to either of the claims 1 or 16, wherein n is equal to 3 or 4.

21. Process according to either of the claims 11 or 14, wherein the molecules are constituted by a non-amphiphilic cation carrying n polymerizable functions and an amphiphilic anion having at least one hydrophobic chain and in that, after the polymerization of the cations of the monomolecular layer, the anions having at least one hydrophobic chain are eliminated.

22. Process according to claim 21, wherein the anions are eliminated by destroying the ion bonds between said anions and the non-amphiphilic cations by the action of an inorganic acid in order to replace these anions by the anion of said acid and then dissolving the thus freed amphiphilic anions in an organic solvent.

* * * * *